United States Patent

Someya

[11] Patent Number: 5,964,456
[45] Date of Patent: Oct. 12, 1999

[54] VIBRATION ISOLATING APPARATUS

[75] Inventor: Katsumi Someya, Yokohama, Japan

[73] Assignee: Bridgestone Corporation, Tokyo, Japan

[21] Appl. No.: 08/923,295

[22] Filed: Sep. 4, 1997

[30] Foreign Application Priority Data

Sep. 10, 1996 [JP] Japan .................................... 8-239018

[51] Int. Cl.[6] .................................................. F16F 5/00
[52] U.S. Cl. ...................................................... 267/140.13
[58] Field of Search ........................ 267/140.11, 140.13, 267/219; 180/300, 312; 248/562, 636

[56] References Cited

U.S. PATENT DOCUMENTS

| | | | |
|---|---|---|---|
| 4,869,471 | 9/1989 | Schwarz et al. | 267/33 |
| 5,167,403 | 12/1992 | Muramatsu et al. | 267/140.13 |
| 5,170,998 | 12/1992 | Muramatsu | 267/140.13 |
| 5,183,243 | 2/1993 | Matsumoto | 267/140.11 |
| 5,267,726 | 12/1993 | Takeo et al. | 267/219 |
| 5,645,138 | 7/1997 | Tajima et al. | 180/300 |
| 5,775,666 | 7/1998 | Tsukamoto et al. | 248/636 |

FOREIGN PATENT DOCUMENTS

| | | |
|---|---|---|
| A-5-44770 | 2/1993 | Japan . |
| A-6-129478 | 5/1994 | Japan . |
| A-6-264956 | 9/1994 | Japan . |
| A-6-330981 | 11/1994 | Japan . |

*Primary Examiner*—Robert J. Oberleitner
*Assistant Examiner*—Robert A. Siconolfi
*Attorney, Agent, or Firm*—Oliff & Berridge, PLC

[57] ABSTRACT

A vibration isolating apparatus includes a first mounting member; a second mounting member formed in a substantially cylindrical shape with a distal end side having a smaller diameter than a diameter of a base end side, the second mounting member being disposed at an outer peripheral side of the first mounting member; an engaging portion formed by projecting the second mounting member toward an inner peripheral side at an axial direction substantially intermediate position between the distal end side and the base end side of the second mounting member; an elastic body disposed between the first and second mounting members; a liquid chamber containing a liquid therein in a sealed manner; a separating wall member having an outer peripheral side which engages with the engaging portion of the second mounting member so as to be positioned in an axial direction, and separating the liquid chamber into a pair of small liquid chambers by being fixed within the liquid chamber; and a bracket in which the second mounting member is inserted from the distal end side thereof and in which the base end side of the second mounting member is press fitted. Accordingly, a sealing by the separating wall member can be stabilized.

14 Claims, 8 Drawing Sheets

VIBRATION ISOLATING APPARATUS

BACKGROUND OF THE INVENTION

1. Field of the Invention

The present invention relates to a vibration isolating apparatus which used to prevent transmission of vibrations from a vibration generating portion, the apparatus being applicable to a mount for supporting a member such as an engine or the like which generates vibrations.

2. Description of the Related Art

For example, in a conventional structure, a vibration isolating apparatus serving as an engine mount is disposed between an engine, which is a vibration generating portion of a vehicle, and a vehicle body, which is a vibration receiving portion of the vehicle. Vibrations generated by the engine are absorbed by the vibration isolating apparatus and are prevented from being transmitted to the vehicle body.

A structure in which an elastic body and a pair of liquid chambers are provided within the vibration isolating apparatus and a restricted passage serving as an orifice communicates these liquid chambers is known as such a vibration isolating apparatus. When an engine installed in a vehicle is operated so that vibrations are generated, the vibrations are absorbed by the damping function of the elastic body, the viscous resistance of the liquid within the orifice communicating the liquid chambers and the like, so that transmission of the vibrations is prevented.

An example of such a structure will be described hereinafter with reference to a vibration isolating apparatus 110 shown in FIGS. 5 and 6.

As shown in these drawings, an elastic body 118 made of rubber is disposed between and adhered by vulcanization to an outer cylindrical metal fitting 120 and an upper mounting metal fitting 116. Further, the outer cylindrical metal fitting 120 is inserted into a bracket 114, and a rebound stopper metal fitting 112 is caulked to the bracket 114.

Further, a liquid chamber 124 is provided between a diaphragm 122 disposed within the outer cylindrical metal fitting 120 and the elastic body 118. A separating wall member 130, which has an orifice 132 and separates the liquid chamber 124 into a pair of liquid chambers 124A and 124B, is disposed within the liquid chamber 124.

Accordingly, in the vibration isolating apparatus 110, the liquid within both the liquid chambers 124A and 124B flows through the orifice 132 communicating the liquid chambers 124A and 124B with each other, so as to reduce the vibration.

However, in assembling the conventional vibration isolating apparatus 110 described above, when the entire outer periphery of the outer cylindrical metal fitting 120 is inserted into the bracket 114 by press fitting, since a great force is applied to the outer cylindrical metal fitting 120, the separating wall member 130 or the like is deformed, and the ability of the separating wall member 130 to seal the liquid chambers may deteriorate.

A measure to counter this problem has been considered in which the outer cylindrical metal fitting 120 is inserted into the bracket 114 with a lower portion 120B of the outer cylindrical metal fitting 120 not being press fitted and only an upper portion 120A thereof being inserted into the bracket 114 by press fitting. Thereafter, the sealing of the liquid chambers is performed by suitably connecting the lower portion 120B of the outer cylindrical metal fitting 120 and the bracket 114 by means of a drawing process.

However, in this case, the lower portion 120B of the outer cylindrical metal fitting 120 shown in FIG. 7 is inclined toward an inner peripheral side as shown by the two-dot chain lines due to the effects of the upper portion 120A of the outer cylindrical metal fitting 120, so that the lower portion 120B is not smoothly deformed. Accordingly, the separating wall member 130 is unstable within the outer cylindrical metal fitting 120 such that the sealing between the pair of liquid chambers 124A and 124B by the separating wall member 130 may be insufficient and the sealing of the liquid chamber 124 itself may be insufficient such that there is a risk that the liquid within the liquid chamber 124 may leak to the exterior thereof.

Further, when the vibration isolating apparatus is being assembled by the above method, since the position of the separating wall member 130 is restricted only by a step 118A of the elastic body 118 which is elastic and flexible, the separating wall member 130 is moved in the vertical direction in the drawing or the separating wall member 130 rides onto the elastic body 118. As a result, it is difficult to stably seal the pair of liquid chambers 124A and 124B by the separating wall member 130.

A measure to counter this problem has been considered in which a vibration isolating apparatus 210 (see FIG. 8) is provided which is structured such that a pair of outer cylindrical metal fittings 220A and 220B are employed as the outer cylindrical metal fitting, and a separating wall member 230 having an orifice 232 is caulked between the pair of outer cylindrical metal fittings 220A and 220B so as to be disposed within a liquid chamber 224. However, in this vibration isolating apparatus 210, since a sealing portion 230A of the separating wall member 230 is disposed at the outer peripheral side of the vibration isolating apparatus 210 and is sealed by caulking, the caulked portion projects toward the outer peripheral side of the vibration isolating apparatus 210.

SUMMARY OF THE INVENTION

The present invention has been achieved by taking the above facts into consideration, and a first object of the present invention is to provide a vibration isolating apparatus in which stable sealing by a separating wall member is achieved, and a second object of the present invention is to provide a vibration isolating apparatus in which there is no caulked portion projecting toward an outer peripheral side such that the vibration isolating apparatus can be made compact in the radial direction.

In accordance with an aspect of the present invention, there is provided a vibration isolating apparatus comprising:

a first mounting member connected to one of a vibration generating portion and a vibration receiving portion;

a second mounting member formed in a substantially cylindrical shape with a distal end side having a smaller diameter than a diameter of a base end side, the second mounting member being disposed at an outer peripheral side of the first mounting member;

an engaging portion formed by projecting the second mounting member toward an inner peripheral side at an axial direction substantially intermediate position between the distal end side and the base end side of the second mounting member;

an elastic body disposed between the first mounting member and the second mounting member;

a liquid chamber, at least a portion of an inner wall of the liquid chamber being formed by the elastic body, and the liquid chamber containing a liquid therein in a sealed manner;

a separating wall member having an outer peripheral side which engages with the engaging portion of the second mounting member so as to be positioned in an axial direction, and separating the liquid chamber into a pair of small liquid chambers by being fixed within the liquid chamber by the distal end side of the second mounting member being drawn, and having an orifice for communicating the pair of small liquid chambers; and a bracket connected to the other of the vibration generating portion and the vibration receiving portion, the second mounting member being inserted into the bracket from the distal end side of the second mounting member, the base end side of the second mounting member being press fitted into the bracket, and the bracket housing the first mounting member, the second mounting member and the elastic body.

The following operation is obtained by the above-described vibration isolating apparatus.

The elastic body is disposed between the first mounting member and the second mounting member. The liquid chamber containing the liquid in a sealed manner is formed by an inner wall which is at least partly formed by the elastic body. Further, the separating wall member, which is disposed within the liquid chamber and separates the liquid chamber into the pair of small liquid chambers, includes the orifice which communicates the pair of small liquid chambers with each other. The second mounting member is press fitted into the bracket, and the pair of mounting members and the elastic body are housed within the bracket.

Accordingly, when vibrations are transmitted from the vibration generating portion which is connected, for example, to the first mounting member, the elastic body is deformed. Together with this deformation, the liquid chamber expands and contacts such that the pressure of the liquid within the orifice of the separating wall member changes and the liquid flows. The vibrations are damped by the deformation of the elastic body, the pressure change of the liquid, and the flow of the liquid. Therefore, it is difficult for the vibrations to be transmitted to the vibration receiving portion.

Further, in accordance with the present invention, the vibration isolating apparatus includes the engaging portion which projects toward the inner peripheral side at an axial direction substantially intermediate position of the second mounting member which is formed in a cylindrical shape. Accordingly, the outer peripheral side of the separating wall member is engaged with the engaging portion so as to position the separating wall member in the axial direction. The separating wall member can thereby be stably positioned within the liquid chamber and can reliably seal between the pair of small chambers. Further, since the separating wall member is disposed at the inner side of the vibration isolating apparatus and dose not project outwardly of the second mounting member, the vibration isolating apparatus can be made compact in the radial direction.

The sealing between the pair of small liquid chambers by the separating wall members can be achieved by drawing the outer diameter of the second mounting member. The engaging portion which projects toward the inner peripheral side is provided at the second mounting member between the axial direction end sides thereof. Of the axial direction end sides of the second mounting member, only the distal end side (i.e., the leading end side in the direction of inserting the second mounting member into the bracket) is subjected to drawing processing. Further, at the time of drawing processing, together with the extension of the engaging portion, only the distal end side is deformed and does not give effect the base end side. Therefore, the distal end side is easily deformed independently of the base end side which is the portion of the second mounting member which is not drawn. Accordingly, subjecting the second mounting member to drawing processing is easy, and the diameter of the seal portion can be substantially uniformly reduced along the axial direction.

Accordingly, insufficient sealing between the pair of small liquid chambers by the separating wall member and insufficient sealing of the liquid chamber from the exterior, which drawbacks were present in the conventional art, can be eliminated.

The pair of portions of the second mounting member between which, in the axial direction of the second mounting member, the engaging portion is disposed are the distal end side (leaking end side) in the direction of press fitting the second mounting member into the bracket and the base end side. The distal end side is formed so as to have a smaller diameter than that of the base end side.

Namely, by providing a difference between the outer diameters, it is possible to make the base end side in the press fitting direction a fitted portion by press fitting to the bracket, and to make the distal end side in the press fitting direction a seal portion for ensuring the sealing between the pair of small liquid chambers by the separating wall member. In this way, respective portions of the second mounting member have respectively different roles (functions).

Accordingly, it is possible to eliminate the application of load to the sealing portion at the time of press fitting the second mounting member into the bracket.

DETAILED DESCRIPTION OF THE PREFERRED EMBODIMENT

An embodiment of a vibration isolating apparatus in accordance with the present invention will be shown in FIGS. 1 to 4 and will be explained below with reference to these drawings.

Figure 1:
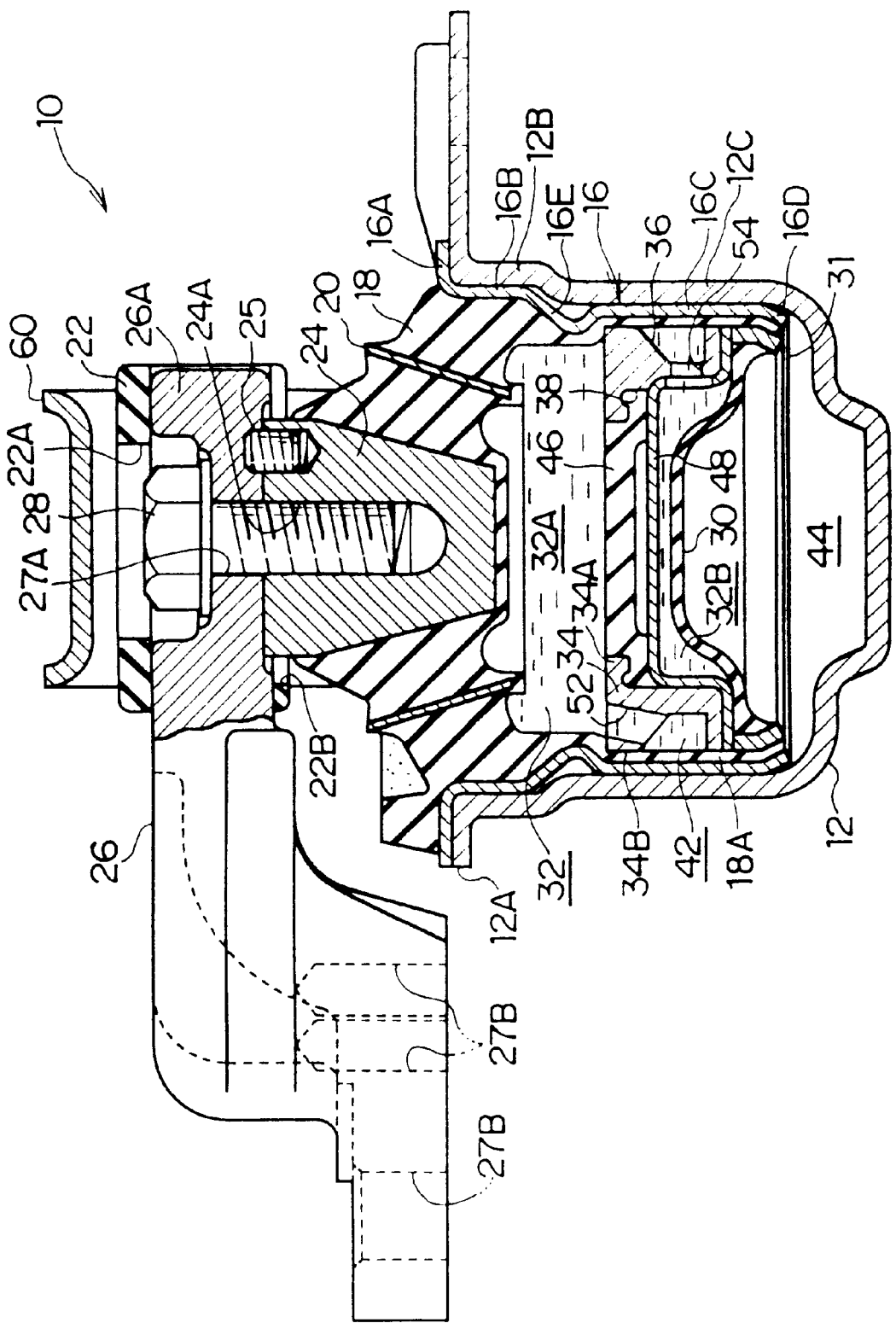
FIG. 1 is a partial cross sectional view which shows an embodiment of a vibration isolating apparatus in accordance with the present invention.

As shown in FIG. 1 which illustrates the present embodiment, one of the mounting members of a vibration isolating apparatus 10 is an outer cylindrical metal fitting 16 formed by a cylindrical thin metal material. The outer cylindrical metal fitting 16 includes a first cylindrical portion 16B formed in a cylindrical shape, and a second cylindrical portion 16C formed in a cylindrical shape at the lower side of the first cylindrical portion 16B and having an outer diameter slightly smaller than an outer diameter of the first cylindrical portion 16B.

An engaging portion 16E, which projects toward an inner peripheral side and is formed by depressing the outer peripheral surface of the outer cylindrical metal fitting 16 along the periphery thereof by a press forming or the like, is provided at an intermediate position in the axial direction between the first cylindrical portion 16B and the second cylindrical portion 16C of the outer cylindrical metal fitting 16. Further, a circular-plate-shaped flange portion 16A is formed at the upper end portion of the outer cylindrical metal fitting 16. A taper portion 16D, which is compressed in a taper shape, is formed at the lower end portion of the outer cylindrical metal fitting 16.

The outer cylindrical metal fitting 16 is press fitted to a bracket 12, which is formed in a cup shape, so as to be disposed within the bracket 12. A flange portion 12A expanding toward an outer periphery is formed at the upper portion of the bracket 12. An upper side portion of the bracket 12 opposing the first cylindrical portion 16B of the outer cylindrical metal fitting 16 is an upper portion cylindrical portion 12B which is closely fit with the first cylindrical portion 16B. A lower side portion of the bracket 12 opposing the second cylindrical portion 16C of the outer cylindrical metal fitting 16 is a lower portion cylindrical portion 12C which is formed so as to have a diameter slightly smaller than that of the upper portion cylindrical portion 12B. There is a slight gap (not shown) between the lower portion cylindrical portion 12C and the second cylindrical portion 16C.

Figure 2:
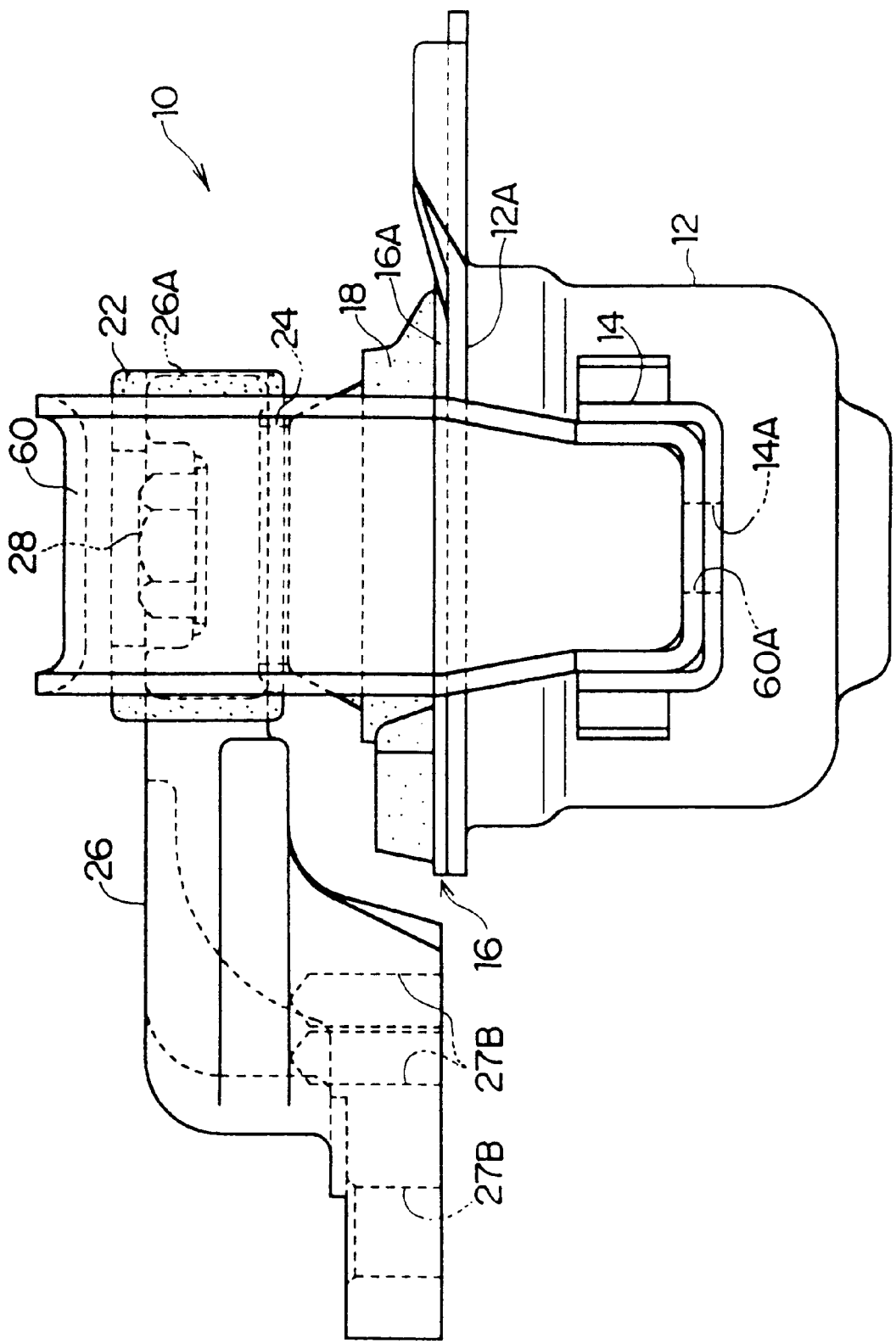
FIG. 2 is a side view which shows the embodiment of the vibration isolating apparatus in accordance with the present invention.
Figure 3:
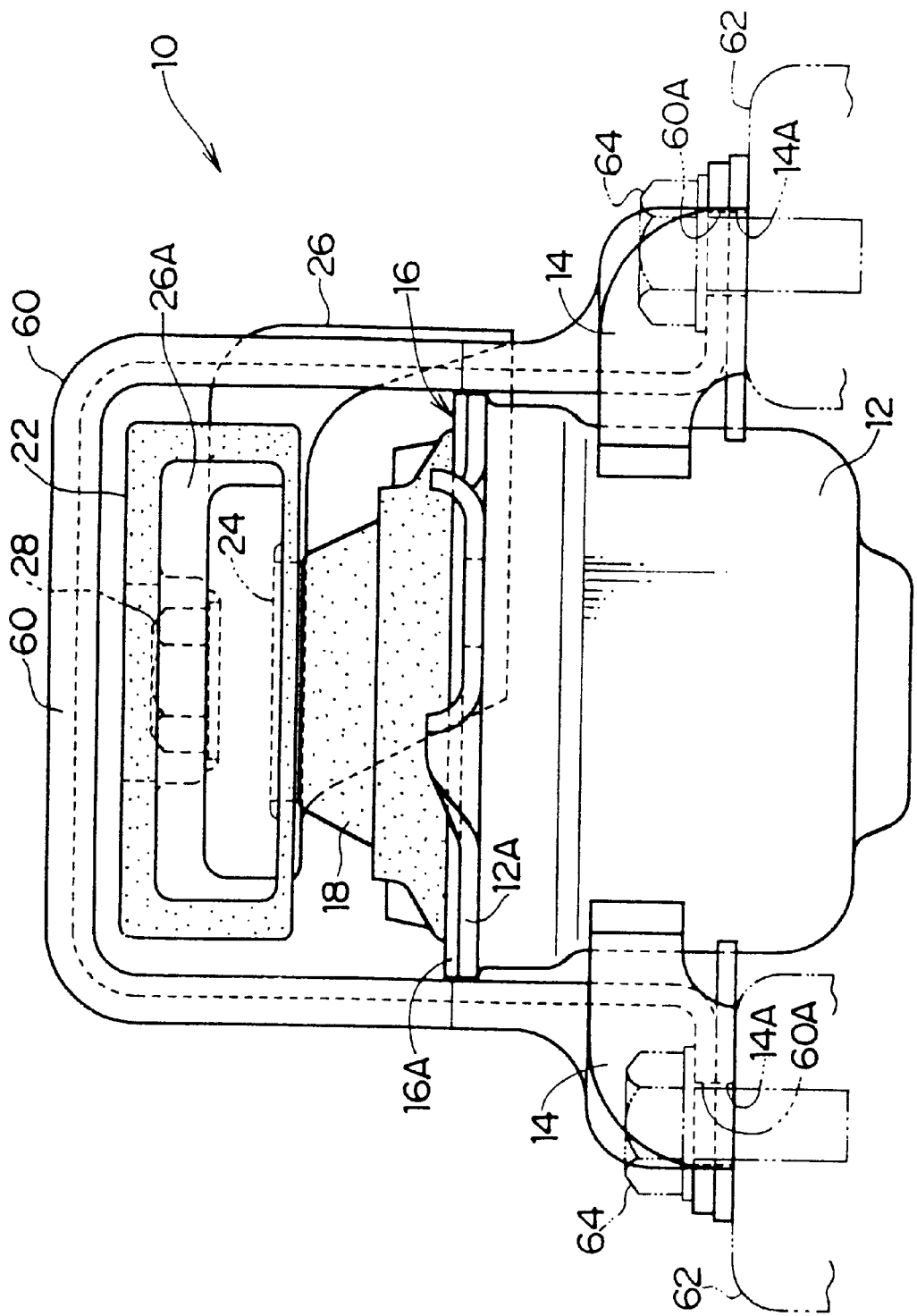
FIG. 3 is another side view which shows the embodiment of the vibration isolating apparatus in accordance with the present invention.
Figure 4:
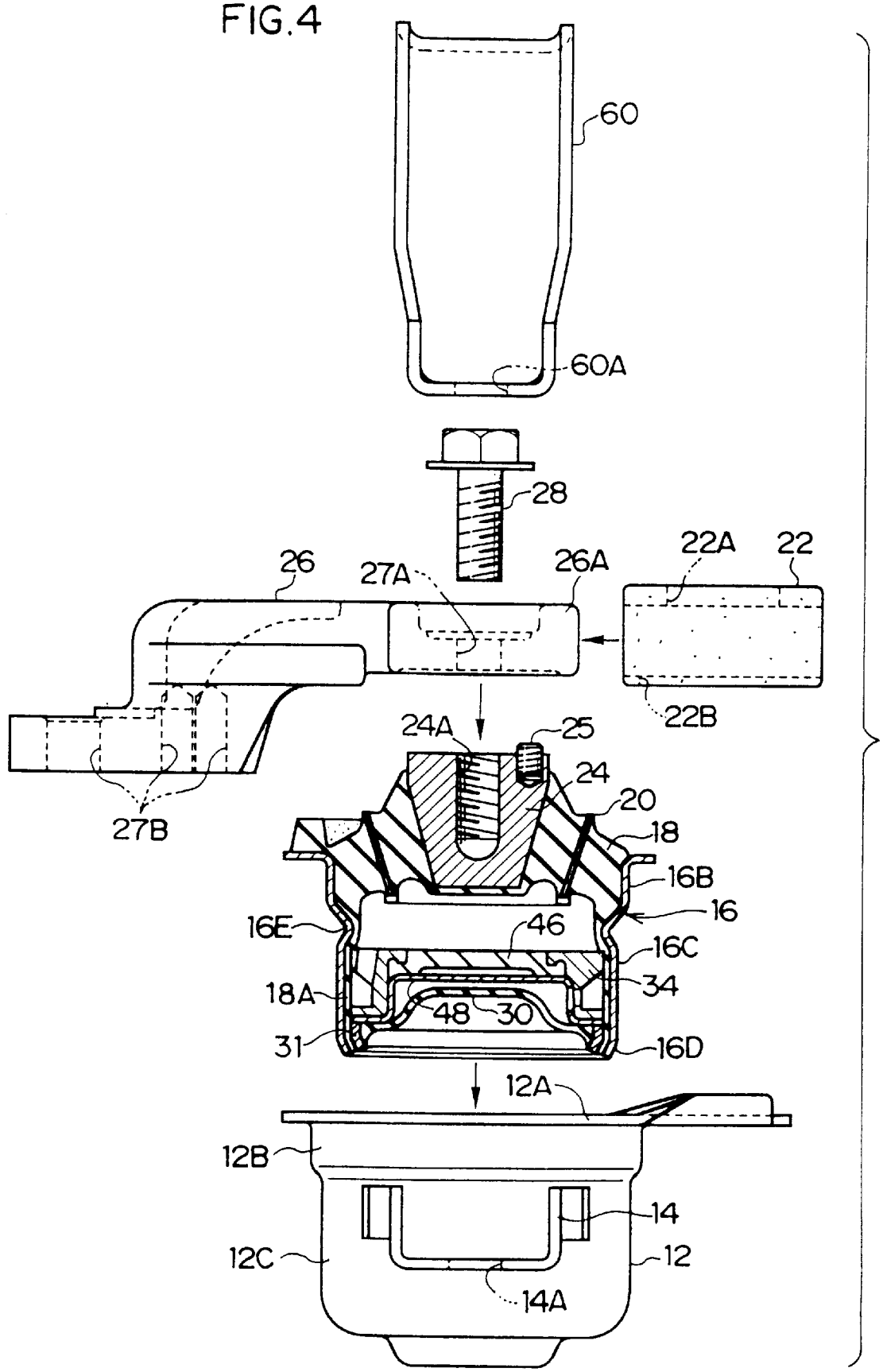
FIG. 4 is a cross sectional view for explaining assembly of the embodiment of a vibration isolating apparatus in accordance with the present invention.
Figure 5:
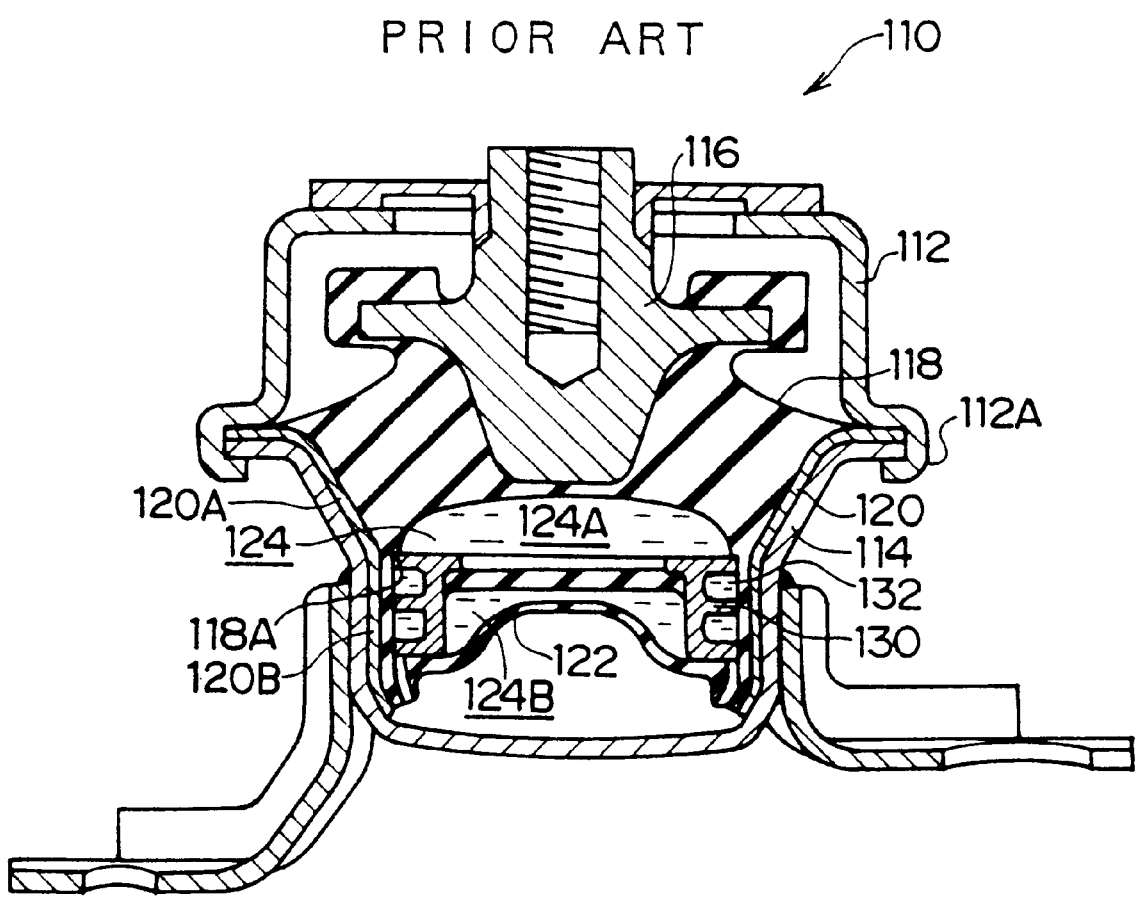
FIG. 5 is a cross sectional view which shows a first conventional vibration isolating apparatus.
Figure 6:
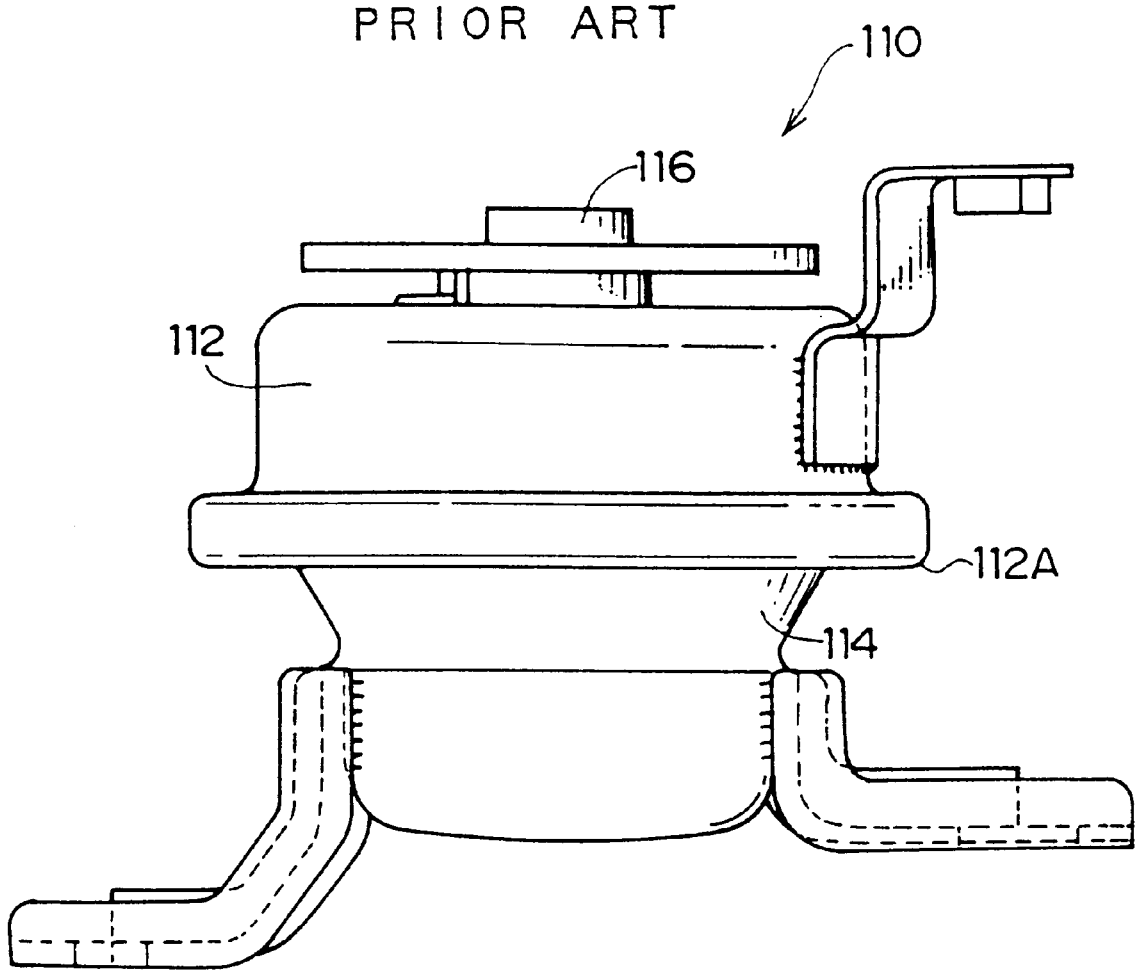
FIG. 6 is a side view which shows the first conventional vibration isolating apparatus.
Figure 7:
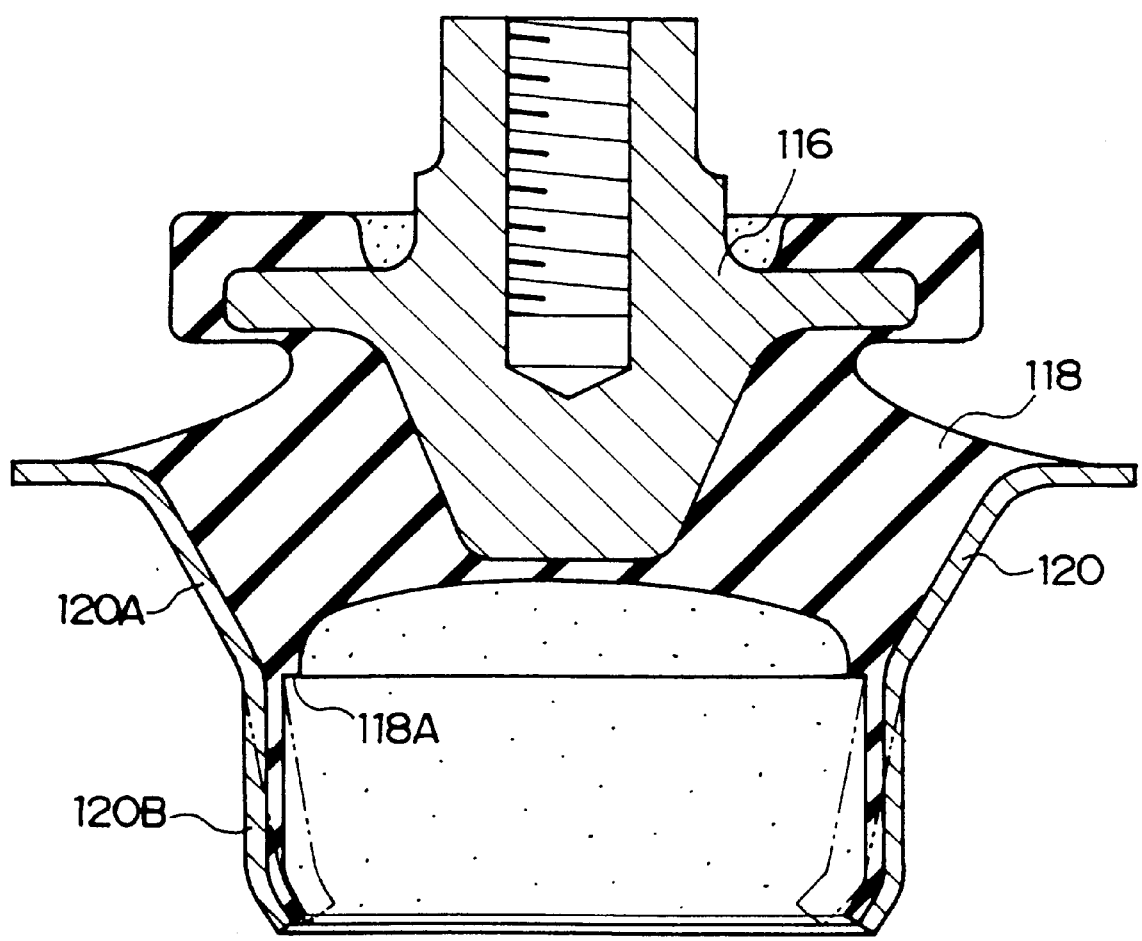
FIG. 7 is a cross sectional view which shows an outer cylindrical metal fitting of the first conventional vibration isolating apparatus.
Figure 8:
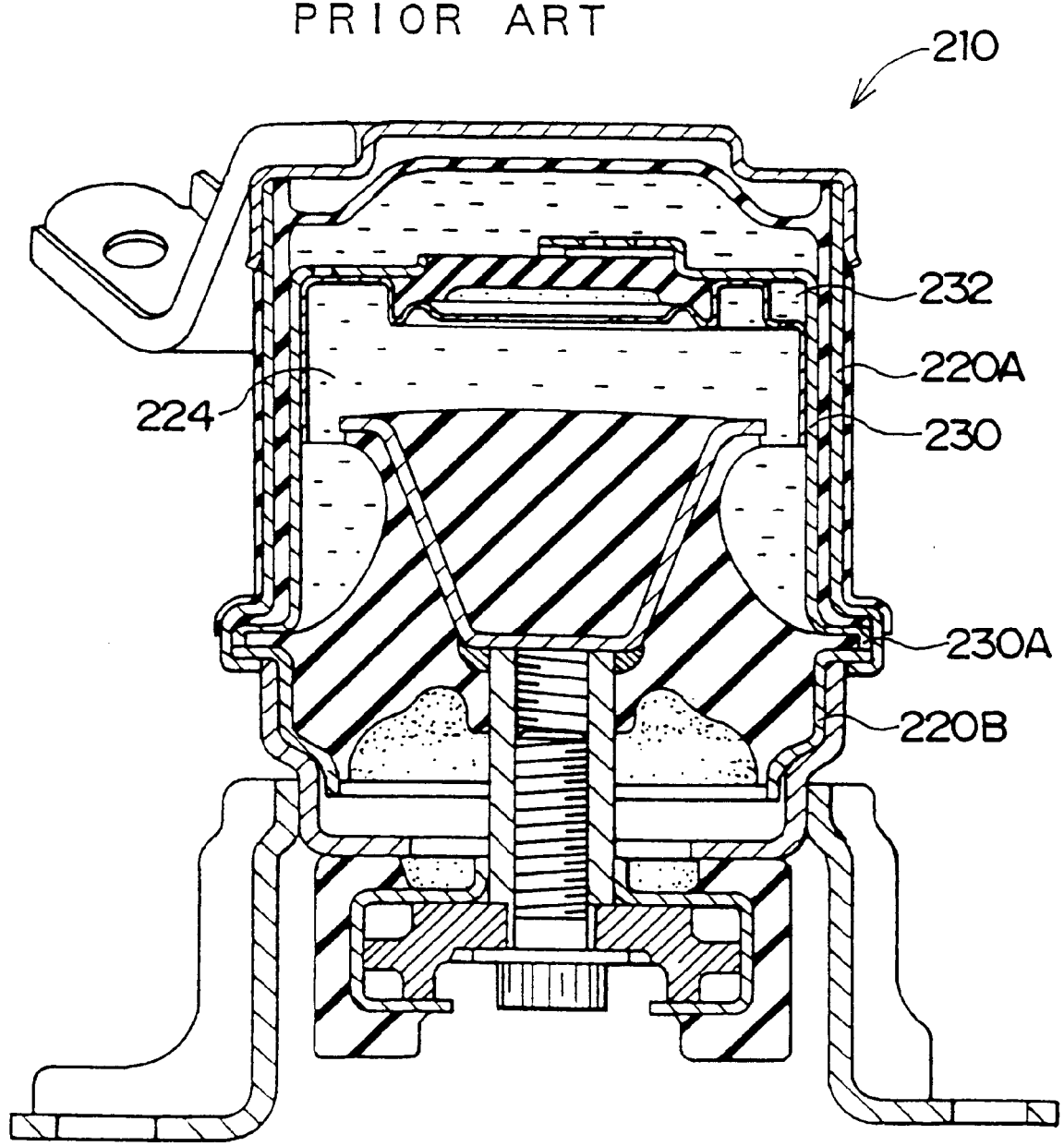
FIG. 8 is a cross sectional view which shows a second conventional vibration isolating apparatus.

A pair of leg portions 14 each formed in a U-shape is provided at the outer peripheral side of the bracket 12 in such a manner as to project toward the outer peripheral side of the bracket 12, as shown in FIGS. 2 and 3.

Further, an outer peripheral surface of a rubber elastic body 18, which is formed in a cylindrical shape and in which an interring 20 is embedded, is adhered by vulcanization to the internal peripheral surface of the outer cylindrical metal fitting 16 so that the outer cylindrical metal fitting 16 surrounds and holds the elastic body 18. A portion of the elastic body 18 corresponding to the second cylindrical portion 16C of the outer cylindrical metal fitting 16 is a thin portion 18A having a thin thickness.

An upper portion mounting member 24 made of metal and formed in a conical shape is embedded in a central portion of the elastic body 18 and adhered thereto by vulcanization. An upper end portion of the upper portion mounting member 24 projects from the elastic body 18. A screw hole 24A having a female screw is provided in the upper portion mounting member 24, and a rotation prevention pin 25 is attached to the upper portion mounting member 24.

As mentioned above, the elastic body 18 is disposed and mounted between the upper portion mounting member 24 which is a first mounting member and the outer cylindrical metal fitting 16 which is a second mounting member. The outer cylindrical metal fitting 16, the upper portion mounting member 24 and the elastic body 18 are housed in the bracket 12 by press fitting the first cylindrical portion 16B of the outer cylindrical metal fitting 16 into the upper portion cylindrical portion 12B of the bracket 12.

An arm bracket 26 is provided at a position at the upper side of the upper portion mounting member 24 and opposing the top surface of the upper portion mounting member 24 via a stopper rubber 22. Namely, a square pillar portion 26A, which is a base end side of the arm bracket 26 and is formed by iron casting or the like, is press fitted into the cylindrical stopper rubber 22, such that the arm bracket 26 is disposed via the stopper rubber 22. A hole 22A is formed in the top wall of the stopper rubber 22, an opening 22B is formed in the bottom wall of the stopper rubber 22, and a through hole 27A is formed in the square pillar portion 26A.

Further, a fastening bolt 28 is inserted from above into the hole 22A formed in the top wall of the stopper rubber 22, the through hole 27A formed in the square pillar portion 26A and the opening 22B formed in the bottom wall of the stopper rubber 22. Together with this insertion, the fastening bolt 28 is screwed into the screw hole 24A of the upper portion mounting member 24 so that the arm bracket 26 is fixed to the upper portion mounting member 24.

Still further, a plurality of bolt holes 27B for connecting the arm bracket 26 to an engine (not shown), which serves as a vibration generating portion, are formed in the distal end side of the arm bracket 26. Accordingly, the upper portion mounting member 24 projecting from the elastic body 18 is used for connection to the engine such that the upper portion mounting member 24 is connected to the engine, which is the vibration generating portion, via the arm bracket 26.

A rebound stopper metal fitting 60 for limiting displacement of the upper portion mounting member 24 to a certain range is disposed at the top portion of the upper portion mounting member 24 via the arm bracket 26 in such a manner as to oppose to the upper portion mounting member 24. In FIG. 3, the end portions of the rebound stopper metal fitting 60 having an inverse U-shaped configuration are press fitted into the pair of leg portions 14.

Through holes 14A and 60A are formed in the leg portions 14 and the both end portions of the rebound stopper metal fitting 60, respectively. A pair of fastening screws 64 shown in FIG. 3 pass through the through holes 14A of the leg portions 14 and the through holes 60A of the rebound stopper metal fitting 60 and are fastened to a vehicle body 62 serving as a vibration receiving portion so that the vibration isolating apparatus 10 is fixed to the vehicle body 62.

A ring member 31 is fit within and fixed to the second cylindrical portion 16C. A rubber diaphragm 30 is adhered by vulcanization to the inner peripheral surface of the ring member 31.

A liquid chamber 32, whose inner peripheral walls are formed by the diaphragm 30 and the elastic body 18, is provided between the diaphragm 30 and the elastic body 18. A liquid such as water, oil or the like is housed within the liquid chamber 32 in a sealed manner. Within the liquid chamber 32, a separating wall member 34 formed by, for example, a synthetic resin material, is fitted with the inner wall surface of the thin portion 18A of the elastic body 18 and an outer peripheral side thereof is engaged with the engaging portion 16E so as to be positioned in the axial direction. As a result, the separating wall member 34 separates the liquid chamber 32 into a pair of small liquid chambers, that is, a main liquid chamber 32A and a sub liquid chamber 32B.

Further, a circular opening 38 is formed in a central portion of the separating wall member 34. A groove portion 36 is provided in the outer peripheral end portion 34B which is an outer peripheral surface of the separating wall member 34. The groove portion 36 is formed in a groove shape along substantially the entire periphery of the outer peripheral end portion 34B. A small hole 52 communicating the main liquid chamber 32A with the inside of the groove portion 36 is formed in an end portion of the groove portion 36. A small hole 54 for communicating the sub liquid chamber 32B with the inside of the groove portion 36 is formed in the other end portion of the groove portion 36. Accordingly, the groove portion 36 and the small holes 52 and 54, which are closed by the inner wall surface of the elastic body 18, form an orifice 42 for communication between the main liquid chamber 32A and the sub liquid chamber 32B.

A space between the diaphragm 30 and the bottom wall of the bracket 12 is an air chamber 44, which makes it possible for the diaphragm 30 to deform.

A rib 34A projecting toward an inner peripheral side is formed at a portion of the separating wall member 34 near the upper portion of the opening 38. A membrane 46 which is an elastic plate having a circularly projecting central portion is anchored by the rib 34A.

A metal circular plate 48, which has a central portion which circularly projects so as to be fitted into the opening 38, abuts a lower side outer peripheral portion of the membrane 46 such that the membrane 46 is held by the circular plate 48 and the rib 34A. The outer peripheral end side of the circular plate 48 is held between the diaphragm 30 and the separating wall member 34 so as to be fixed between them, and has the illustrated hole portion at a position of the circular plate 48 corresponding to the small hole 54.

Next, procedures of manufacturing the vibration isolating apparatus 10 in accordance with the present embodiment will be explained.

First, the outer cylindrical metal fitting 16 having the first cylindrical portion 16A, the second cylindrical portion 16C, the engaging portion 16E and the like is formed by press forming. The upper portion mounting member 24 and the outer cylindrical metal fitting 16 are placed in a metal mold, and the elastic body 18 is vulcanized.

Further, within the liquid, the separating wall member 34, the diaphragm 30 and the like, to which the membrane 46 and the circular plate 48 are attached, are inserted into the outer cylindrical metal fitting 16. With these parts inserted in the outer cylindrical metal fitting 16, while the separating wall member 34 is axially positioned by the outer peripheral side of the separating wall member 34 engaging with the engaging portion 16E of the outer cylindrical metal fitting 16, the second cylindrical portion 16C of the outer cylindrical metal fitting 16 is drawn and the lower end portion of the outer cylindrical metal fitting 16 is caulked so as to form the taper portion 16D.

Accordingly, not only are these members housed within the outer cylindrical metal fitting 16, but also, the thin portion 18A of the elastic body 18 and the ring member 31 are closely brought into contact with each other and fitted together so as to seal the liquid chamber 32. Further, the thin portion 18A and the separating wall member 34 are closely brought into contact with each other and fitted together such that the separating wall member 34 seals between the pair of liquid chambers 32A and 32B, which is the state shown in FIG. 4. As a result, the separating wall member 34 is held between the engaging portion 16E and the taper portion 16D.

The square pillar portion 26A of the arm bracket 26 is press fitted into the stopper rubber 22. The fastening bolt 28 is inserted through the stopper rubber 22 and the arm bracket 26 so that the arm bracket 26 is fixed to the upper portion mounting member 24.

Next, the outer cylindrical metal fitting 16 is press fitted into the bracket 12, and the upper portion mounting member 24, the outer cylindrical metal fitting 16 and the elastic body 18 are housed in the bracket 12. Together with this operation, the both end portions of the rebound stopper metal fitting 60 are press fitted into the pair of leg portions 14, which are formed so as to project from the bracket 12, so that the rebound stopper metal fitting 60 is provisionally anchored to the pair of leg portions 14. In accordance with the above steps, the assembly of the vibration isolating apparatus 10 is completed as shown in FIGS. 1 and 2.

At a time of press fitting the outer cylindrical metal fitting 16 into the bracket 12, the outer cylindrical metal fitting 16 is inserted into the bracket 12. However, since the second cylindrical portion 16C of the outer cylindrical metal fitting 16 has a diameter slightly smaller than that of the lower portion cylindrical portion 12C of the bracket 12, the outer cylindrical metal fitting 16 is smoothly inserted until midway through the insertion thereof. Then, the first cylindrical portion 16B of the outer cylindrical metal fitting 16 and the upper portion cylindrical portion 12B of the bracket 12 are press fitted so as to be closely fitted to one another, and are thereby fixed to one another.

Thereafter, the vibration isolating apparatus 10 which is completed in the above-described manner is set in a vehicle, and the pair of fastening screws 64 are inserted through the pair of leg portions 14 and the both end portions of the rebound stopper metal fitting 60, thereby fastening the fastening screws 64 to the vehicle body 62. In this way, as shown in FIG. 3, the bracket 12, which is connected to the pair of leg portions 14, and the rebound stopper metal fitting 60 are fixed to the vehicle body 62 so that the vibration isolating apparatus 10 can be mounted to the vehicle body 62. Then, bolts (not shown) are fastened with the plurality of bolt holes 27B of the arm bracket 26 so that the arm bracket 26 is connected to the engine.

Next, operation of the present embodiment will be explained.

When the engine, which is mounted to the upper portion mounting member 24 via the arm bracket 26, is operated, vibrations of the engine are transmitted to the elastic body 18 via the arm bracket 26 and the upper portion mounting member 24.

The elastic body 18 functions as a vibration absorbing main body, and can absorb vibrations by a vibration damping function which is based on the internal friction of the elastic body 18. Further, the liquid within the main liquid chamber 32A and the sub liquid chamber 32B flows back and forth between the chambers through the orifice 42 so that the vibration isolating effect can be improved by the damping operation which is based on the change in the pressure of the liquid which change is generated in the orifice space, the viscous resistance of the liquid flow, and the like.

For example, in a case in which vibrations having a high frequency are transmitted, even if the orifice 42 which can reduce vibrations having a narrow vibration frequency range is blocked such that the vibrations cannot be sufficiently reduced only by the orifice 42, the membrane 46 is elastically deformed so that the internal pressure within the liquid chamber 32 does not become high. As a result, even if vibrations having a high frequency which cannot reduced by the orifice 42 are generated, the apparatus becomes a low frequency moving spring so that the vibration isolating characteristic is not reduced but is maintained, such that the effects of the vibration isolating apparatus 10 are sufficiently exhibited.

On the other hand, when vibrations having an excessive amplitude are input from the engine, the rebound stopper metal fitting 60, which is disposed so as to oppose the outer cylindrical metal fitting 16, limits displacement of the outer cylindrical metal fitting 16 to a certain range.

Further, the outer cylindrical metal fitting 16 is press fitted into the bracket 12, and the outer cylindrical metal fitting 16, the upper portion mounting member 24 and the elastic body 18 are housed in the bracket 12. The outer cylindrical metal fitting 16 has, at the substantially central portion thereof in the axial direction, the engaging portion 16E projecting toward the inner peripheral side. Accordingly, the outer peripheral side of the separating wall member 34 is engaged with the engaging portion 16E and the separating wall member 34 is positioned, in the axial direction, within the liquid chamber 32, so that the set position of the separating wall member 34 within the liquid chamber 32 is stabilized and the separating wall member 34 reliably seals between the pair of liquid chambers 32A and 32B. Since the separating wall member 34 is disposed in the inside of the vibration isolating apparatus 10 and does not projected out of the outer cylindrical metal fitting 16, the vibration isolating apparatus 10 can be made compact in the radial direction thereof.

At the time of assembling the vibration isolating apparatus 10, sealing between the liquid chambers 32A and 32B by the separating wall member 34 is achieved by drawing the second cylindrical portion 16C of the outer cylindrical metal fitting 16. By providing the engaging portion 16E, which projects toward the inner peripheral side, at the outer cylindrical metal fitting 16, it is possible to, without effecting the first cylindrical portion 16B due to extension of the engaging portion 16E, draw only the second cylindrical portion 16C which is one of the axial direction portions of the outer cylindrical metal fitting 16 and between the first cylindrical portion 16B and which the engaging portion 16E is provided. Accordingly, the drawing process of the outer cylindrical metal fitting 16 is easily performed so that the diameter of the seal portion can be substantially uniformly reduced in the axial direction. Therefore, there is no insufficient sealing between the liquid chambers by the separating wall member and no insufficient sealing of the liquid chamber with respect to the exterior, as have occurred in the conventional art.

Further, in the present embodiment, the engaging portion 16E of the outer cylindrical metal fitting 16 is disposed between, along the axial direction of the outer cylindrical metal fitting 16, the second cylindrical portion 16C, which is the leading (distal) end side in the direction of press fitting the outer cylindrical metal fitting 16 into the bracket 12, and the first cylindrical portion 16B, which is the base end side in the direction of fitting the outer cylindrical metal fitting 16 into the bracket. The diameter of the second cylindrical portion 16C is smaller than that of the first cylindrical portion 16B. Namely, by providing a difference between the outer diameters, it is possible to make the base end side in the press fitting direction a fitted portion by press fitting with the bracket 12, and to make the leading end side in the press fitting direction a seal portion between the pair of liquid chambers 32A and 32B by the separating wall member 34. In this way, separate roles are assigned to respective portions of the outer cylindrical metal fitting 16.

Accordingly, it is possible to eliminate load applied to the seal portion at the time of press fitting the outer cylindrical metal fitting 16 into the bracket 12.

The above embodiment is structured such that the upper portion mounting member 24 which is the first mounting member is connected to the engine which is the vibration generating portion and the bracket 12 is connected to the vehicle body 62 which to the vibration receiving portion. However, an opposite structure may be employed, i.e., the upper portion mounting member 24 may be connected to the vibration receiving portion, and the bracket 12 may be connected to the vibration generating portion.

Further, in the above embodiment, the engaging portion 16E is formed around the outer peripheral surface of the outer cylindrical metal fitting 16. However, alternatively, a plurality of engaging portions may be formed along the peripheral direction of the outer cylindrical metal fitting 16.

In the present embodiment, the vibration isolating apparatus is used to isolate the vibrations of an engine which is installed in a vehicle. However, the vibration isolating apparatus in accordance with the present invention can also be applied to a body mount for a vehicle or the like, or to other structures unrelated to vehicles. Further, the shape and the size of the elastic body and the like and the number of orifices are not limited to those used in the present embodiment.

As a result of the above-described structure, the vibration isolating apparatus in accordance with the present invention can prevent the separating wall member from shifting within the liquid chamber so that stable sealing is achieved by the separating wall member, and no caulked portion projecting toward an outer peripheral side is provided so that the vibration isolating apparatus can be made compact in the radial direction thereof.

What is claimed is:

1. A vibration isolating apparatus, comprising:
   a first mounting member connected to one of a vibration generating portion and a vibration receiving portion;
   a second mounting member formed in a substantially cylindrical shape with a distal end side having a smaller diameter than a diameter of a base end side, said second mounting member being disposed at an outer peripheral side of said first mounting member;
   an engaging portion configured as a dent portion in said second mounting member and formed by depressing a portion of said second mounting member toward an inner peripheral side at a substantially intermediate position in an axial direction between the distal end side and the base end side of said second mounting member, such that the dent portion protrudes toward the inner peripheral side of said second mounting member;
   an elastic body disposed between said first mounting member and said second mounting member;
   a liquid chamber, at least a portion of an inner wall of said liquid chamber being formed by said elastic body, and said liquid chamber containing a liquid therein in a sealed manner;
   a separating wall member having an outer peripheral side and being positioned in the axial direction, and separating said liquid chamber into a pair of small liquid chambers by being fixed adjacent said engaging portion and within said liquid chamber by the distal end side of the second mounting member being drawn, and having an orifice for communicating the pair of small liquid chambers; and
   a bracket connected to the other of the vibration generating portion and the vibration receiving portion, said second mounting member being inserted into said bracket from the distal end side of said second mounting member, the base end side of said second mounting member being press fitted into said bracket, and said bracket housing said first mounting member, said second mounting member and said elastic body.

2. A vibration isolating apparatus according to claim 1, wherein said engaging portion is formed by depressing a portion of said second mounting member along the periphery thereof so as to protrude the portion toward an inner peripheral side of said second mounting member.

3. A vibration isolating apparatus according to claim 1, wherein said second mounting member includes a taper portion formed as a taper at a tipmost end portion of the distal end side thereof.

4. A vibration isolating apparatus according to claim 1, wherein said second mounting member is made of a thin metal material.

5. A vibration isolating apparatus according to claim 3, wherein said separating wall member is held between said engaging portion and said taper portion.

6. A vibration isolating apparatus according to claim 3, wherein said taper portion is formed together with drawing processing of the distal end side of said second mounting member.

7. A vibration isolating apparatus according to claim 1, wherein said elastic body includes a thin portion having a thin thickness and provided along the inner peripheral side of said second mounting member.

8. A vibration isolating apparatus according to claim 1, wherein said elastic body is formed of a rubber material.

9. A vibration isolating apparatus according to claim 1, wherein said bracket includes a cylindrical portion and said second mounting member is press fitted into the cylindrical portion.

10. A vibration isolating apparatus according to claim 1, wherein a portion of the inner wall of said liquid chamber is structured by an elastically deformable diaphragm.

11. A vibration isolating apparatus according to claim 1, wherein a portion of a separating wall of one liquid chamber of the pair of small liquid chambers, which are formed by said liquid chamber being separated by said separating wall member, is structured by an elastically deformable diaphragm.

12. A vibration isolating apparatus according to claim 10, wherein said diaphragm is disposed within a ring member formed in a ring shape, and the ring member is fixed to an inner peripheral side of said second mounting member by at least one of a drawing process by which said second mounting member is formed and a process by which the taper portion is formed.

13. A vibration isolating apparatus according to claim 12, wherein said elastic body includes a thin portion having a thin thickness and provided along the inner peripheral side of said second mounting member, and the ring member is fixed to the inner peripheral side of said second mounting member via the thin portion, so as to seal said liquid chamber.

14. A vibration isolating apparatus according to claim 1, wherein an elastically deformable membrane is provided at a portion of said separating wall member opposing either of the small liquid chambers.

\* \* \* \* \*